US012769503B2

(12) United States Patent
Zhang et al.

(10) Patent No.: US 12,769,503 B2
(45) Date of Patent: Oct. 20, 2026

(54) HANDLING OF NOISE AND INTERRUPTION DURING ONLINE MEETINGS

(71) Applicant: CITRIX SYSTEMS, INC., Fort Lauderdale, FL (US)

(72) Inventors: Hui Zhang, Nanjing (CN); Taoyong Ding, Nanjing (CN)

( * ) Notice: Subject to any disclaimer, the term of this patent is extended or adjusted under 35 U.S.C. 154(b) by 624 days.

(21) Appl. No.: 17/658,354

(22) Filed: Apr. 7, 2022

(65) Prior Publication Data

US 2023/0297321 A1 Sep. 21, 2023

Related U.S. Application Data

(63) Continuation of application No. PCT/CN2022/081581, filed on Mar. 18, 2022.

(51) Int. Cl.

| | |
|---|---|
| ***G06F 17/00*** | (2019.01) |
| ***G06F 3/16*** | (2006.01) |
| ***G10L 17/04*** | (2013.01) |
| ***G10L 17/06*** | (2013.01) |
| *H04L 65/4038* | (2022.01) |

(52) U.S. Cl.
CPC .............. *G06F 3/165* (2013.01); *G10L 17/04* (2013.01); *G10L 17/06* (2013.01); *H04L 65/4038* (2013.01)

(58) Field of Classification Search
CPC ......... G06F 3/165; G10L 17/04; G10L 17/06; H04L 65/4038
USPC .......................................................... 704/243
See application file for complete search history.

(56) References Cited

U.S. PATENT DOCUMENTS

| | | | | |
|---|---|---|---|---|
| 2010/0011024 | A1* | 1/2010 | Suzuki | G11B 27/28 715/810 |
| 2014/0247319 | A1* | 9/2014 | Anderson | H04L 12/1827 348/14.08 |
| 2017/0270919 | A1* | 9/2017 | Parthasarathi | G10L 17/06 |
| 2020/0110572 | A1* | 4/2020 | Lenke | G06F 3/167 |
| 2022/0020386 | A1* | 1/2022 | Vanapalli | G10L 21/0208 |

* cited by examiner

*Primary Examiner* — Paul C Mccord

(57) ABSTRACT

A method, a system, and a computer program product for managing interruptions during a network based conference. An audio data stream received from at least one user device communicatively coupled to a network-based conference is received. The processed audio data stream is compared to at least one known voice signal dataset and at least one known interruption signal dataset. An audio connection of the user device to the network-based conference is muted while the user device is communicatively coupled to the network-based conference, based on a determination that the processed audio data stream includes at least one audio signal corresponding to at least one audio signal in the known interruption signal dataset.

16 Claims, 8 Drawing Sheets

HANDLING OF NOISE AND INTERRUPTION DURING ONLINE MEETINGS

CROSS REFERENCE TO RELATED APPLICATIONS

This application is a continuation of and claims priority to the International Patent Application No. PCT/CN2022/081581, filed Mar. 18, 2022 and entitled "Handling of Noise and Interruption During Online Meetings," the disclosure of which is incorporated herein by reference in its entirety.

BACKGROUND

As a large percentage of workforce switched to working remotely, a greater number of online meetings and online video conferences are being conducted each day, as those have been increasingly important to business communication, collaboration, operation, etc. However, during many such online meetings, attendees' environments may become uncontrollable and/or unpredictable, which can disrupt the online meetings and hamper communications. For example, when an attendee is speaking during an online meeting, an unexpected noise can occur which interrupts the speaker and other attendees. Under such circumstance, the speaker will have to click a mute button to mute themselves, try to resolve noise problem around them, and then click unmute to continue speaking. However, this process requires manual intervention (e.g., mute and unmute) and the noise probably has impacted the other attendees before mute. Additionally, if one attendee who does not intend to speak forgets to mute and leaves the meeting unattended, the noise around him/her can interrupt the ongoing meeting.

SUMMARY

In some implementations, the current subject matter relates to a computer implemented method for managing interruptions during an online meeting. The method may include, using at least one processor, processing an audio data stream received from at least one user device communicatively coupled to a network-based conference, comparing the processed audio data stream to at least one known voice signal dataset and at least one known interruption signal dataset, and muting an audio connection of the user device to the network-based conference, while the user device is communicatively coupled to the network-based conference, based on a determination that the processed audio data stream includes at least one audio signal corresponding to at least one audio signal in the known interruption signal dataset.

In some implementations, the current subject matter can include one or more of the following optional features. The known voice signal dataset may include one or more audio signals corresponding to one or more voice signals of a user (e.g., attendee user) of the user device. The known interruption signal dataset may include one or more audio signals received by the user device that do not correspond to one or more voice signals of the attendee user of the user device.

In some implementations, the method may include training one or more models using one or more audio signals corresponding to one or more voice signals of the attendee user of the user device, and determining, using the trained models, that the processed audio data stream includes at least one audio signal corresponding to at least one audio signal in the known voice signal dataset. The method may further include maintaining, based on the determination that the processed audio data stream includes at least one audio signal corresponding to at least one audio signal in the known voice signal dataset, an unmuted audio connection of the user device to the network-based conference.

In some implementations, the method may further include unmuting the audio connection of the user device to the network-based conference based on a determination that the processed audio data stream no longer includes at least one audio signal corresponding to at least one audio signal in the known interruption signal dataset.

In some implementations, the muting may be executed automatically upon the determination that the processed audio data stream includes at least one audio signal corresponding to at least one audio signal in the known interruption signal dataset.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to manage and/or handle noise and/or interruptions during online and/or virtual meetings.

In some implementations, the current subject matter may be configured to provide management and/or handling of various interruptions (e.g., noise, interference, etc.) that may occur during a virtual, online, network-based conference/conferencing, web conferencing and/or other network-based connection meeting ("online meeting" or "network-based conference"). Online meetings provide an ability to connect several computing devices (that may be used by one or more users or meeting attendees) via a network connection in a "live" conversation. Majority of the time, meeting attendees participating in such online meetings are not sitting in sound-proof rooms and, thus, are subject to interference (e.g., voices, music, sounds, etc.), noise, and other interruptions. The current subject matter may be configured to automatically mute an attendee upon determining that a detected interruption does not correspond to the voice of the attendee and/or corresponds to an environmental noise that is high enough to prevent other attendees of the online meeting from being able to participate in the meeting (e.g., hear other attendees). The current subject matter may also be configured to automatically unmute (e.g., execute a functionality (either on the attendee device and/or any other device in the online meeting to allow audio stream from the attendee's device to be received by other attendees in the online meeting) that attendee upon determining that the interruptions have been resolved.

Figure 1:
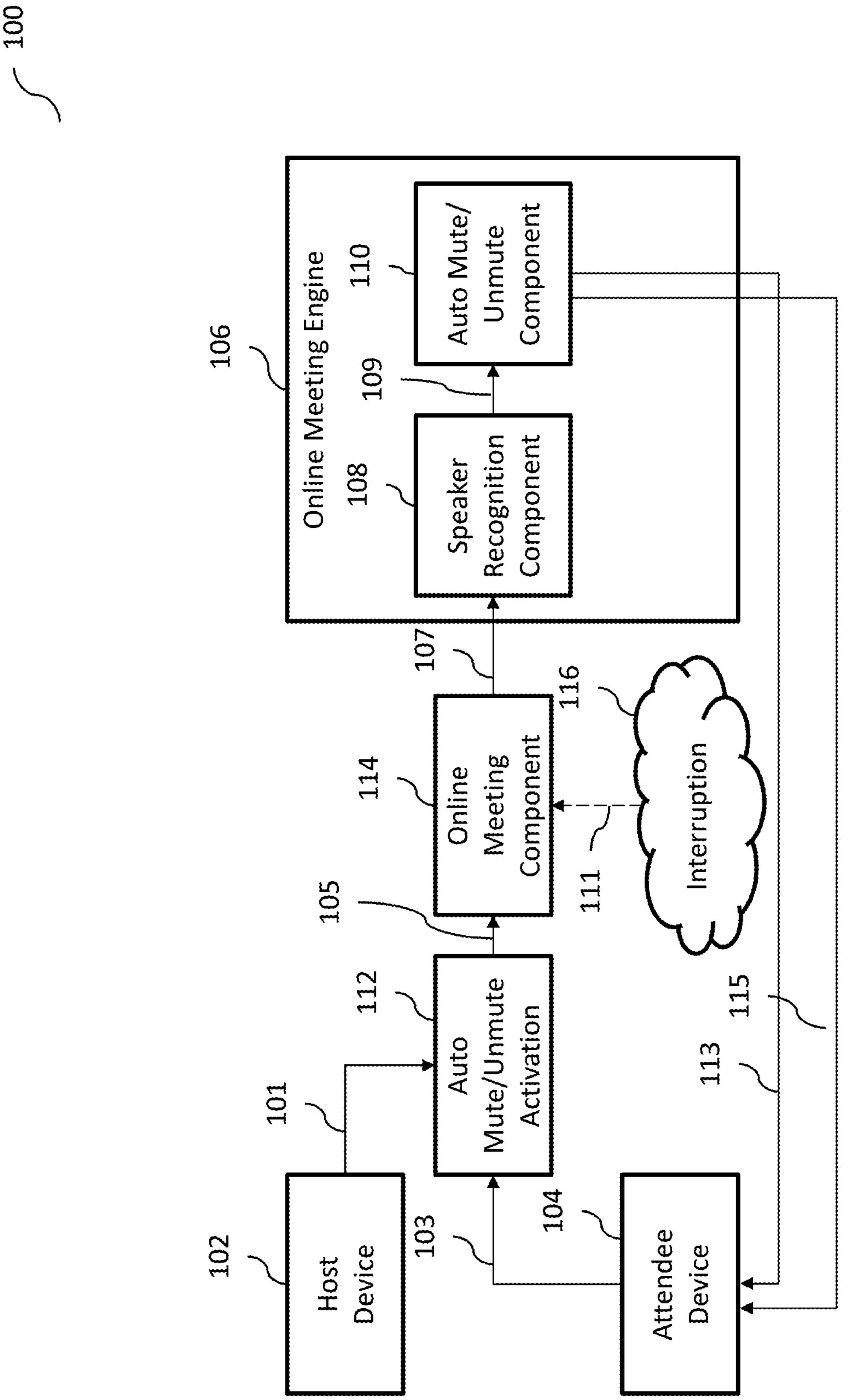
FIG. 1 illustrates an example of a system for managing interruptions during an online meeting, according to some implementations of the current subject matter.

FIG. 1 illustrates an example of a system 100 for managing interruptions during an online meeting, according to some implementations of the current subject matter. The system 100 may be configured to include one or more host devices 102, one or more attendee devices 104, an online meeting engine 106, an auto mute/unmute activation component 112, and an online meeting component 114. The online meeting engine 106 may include one or more speaker recognition component 108 and one or more auto mute/unmute component 110. During an online meeting between devices 102 and 104, one or more interruptions 116 (e.g., interior and/or exterior noise, music, voice(s) of those that are not part of the online meeting, and/or any other interruptions) may affect and/or other cause interruptions during the online meeting. During the online meeting, devices 102-106 may be configured to transmit and/or receive various information, data, files, signals, etc., which may include at least one of the following: a video, an audio, an image, a graphics data, a text data, and/or any other information, data, file, signal that may or may not include a video, an audio, an image, a graphics data, a text data, and/or any other data file.

The system 100 may be configured to be implemented in one or more servers, one or more databases, a cloud storage location, a memory, a file system, a file sharing platform, a streaming system platform and/or device, and/or in any other platform, device, system, etc., and/or any combination thereof. One or more components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or can be part of a single communications network. Alternatively, or in addition to, the components may be separately located from one another.

Referring back to FIG. 1, the devices 102-106 may be equipped with video, audio, file sharing, user interface (e.g., screen) sharing, etc. hardware and/or software capabilities as well as any other computing and/or processing capabilities. One or more of the devices 102 may include a single or multiple computing devices and may be configured to be used by a single user and/or multiple different users.

During an online meeting, the host device 102 and the attendee device 104 may be configured to be communicatively coupled in an online meeting using the online meeting engine 106 via an online meeting component 114, where components 106 and 114 may be a single computing component and/or multiple computing components. The host device 102 may be communicatively coupled to the online meeting via a communication link 101 and the attendee device 104 may be communicatively coupled to the online meeting via a communication line 103. The online meeting component 114 may be a computing component (e.g., a computer, a server, etc.) that may connect devices 102 and 104 using an online meeting software. The host device 102 may be a device that has organized the online meeting and may be a device that has host controls associated with the online meeting (e.g., mute/unmute attendee devices, connect/disconnect devices, etc.). The attendee device 104 may be one of the devices that is connected to the online meeting but does not have host controls.

Each of the host device 102 and the attendee device 104 may be configured to include and/or otherwise be communicatively coupled to an auto-mute/unmute activation component and/or service 112 ("component 112"). The component 112 may be configured to cause execution of an automatic muting (by the component 110 of the online meeting engine 106) of audio generated by the devices 102 and/or 104 upon detecting of interruptions 116, where interruptions 116 may be voices, noise, and/or any other audio that are different from the audio (e.g., voice) generated by the devices 102 and/or 104 during the online meeting.

In some implementations, once the attendee device 104 (and/or host device 102) joins the online meeting, via the communication link 103, using its audio reception sensors (e.g., microphone, etc.), an attendee user of the attendee device 104 may start speaking (e.g., saying "hello", etc.), the speaker recognition component 108 may be configured to start learning the attendee user's voice characteristic (as discussed below with regard to FIG. 3*a*) and later recognize it so that the attendee user does not have to manually mute/unmute when the attendee user is speaking or not.

If an interruption 116 (e.g., noise, other people in an environment of the attendee user speaking that are not intended to be part of the online meeting, etc.) occurs, the online meeting component 114 may be configured to detect it, at 111. The detection may be performed by the component 114 through processing of the audio that is received from the attendee device 104. The processed audio is transmitted, at 107, to the speaker recognition component 108, which, based on learning the attendee user's voice, may determine that audio that does not correspond to the attendee user's voice is present. The component 108 may transmit a command, at 109 to the auto mute/unmute component 110 to execute an auto mute command to the mute the audio in the online meeting produced by the attendee device 104, at 113, so that the audio that includes the detected interruption is not heard by other attendees in the online meeting. Additionally, in some example implementations, the online meeting engine 106 may be configured to transmit an alert to the online meeting (e.g., via an online meeting chat) stating that the attendee device 104 has been muted and as soon as the interruption is resolved will return to the online meeting.

Further, while the attendee device 104 is muted in the online meeting, the online meeting component 114 continues to monitor audio signals generated by the attendee device 104, and provide the audio signals to the speaker recognition component 108 for analysis. If the component 108 determines that the previously detected interruption 116 (or any other interruption) is no longer present, the speaker recognition component 108 may transmit a command, at 109 to the auto mute/unmute component 110 to execute an auto unmute command to the unmute the audio in the online meeting produced by the attendee device 104, at 115, so that the attendee user of the attendee device 104 may continue speaking and be heard by other attendees in the online meeting. Additionally, in some example implementations, the online meeting engine 106 may be configured to transmit an alert to the online meeting (e.g., via an online meeting chat) stating that the attendee device 104 has been unmuted.

Figure 2:
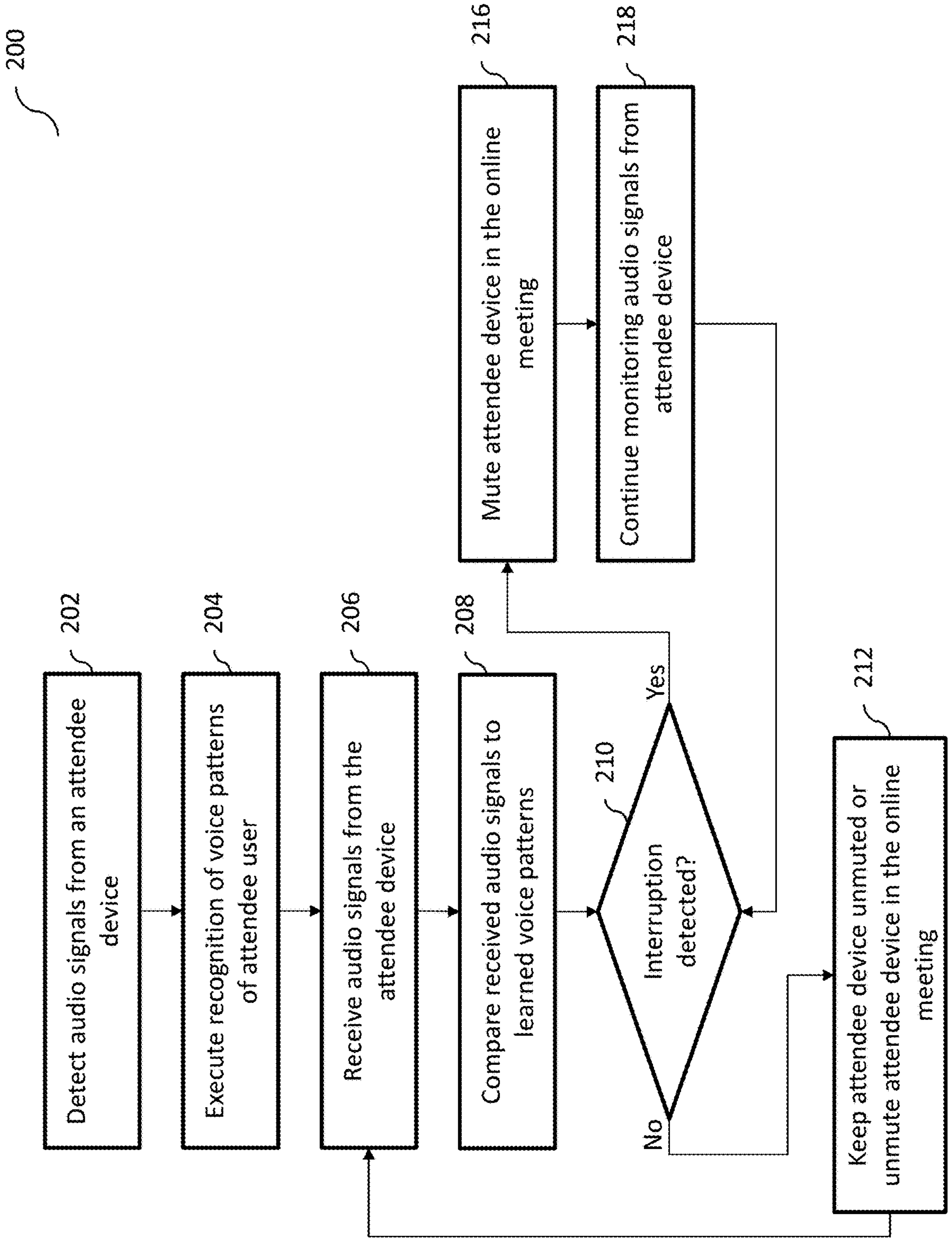
FIG. 2 illustrates an example process for managing interruptions during an online meeting, according to some implementations of the current subject matter.

FIG. 2 illustrates an example process 200 for managing interruptions during an online meeting, according to some implementations of the current subject matter. The process 200 may be performed by the system 100 shown in FIG. 1. In particular, one or more components 114, and/or 106 (which may be multiple and/or a single computing component) may be configured to execute process 200.

At 202, one or more audio signals may be detected from one or more attendee devices 104. The components 106 and/or 114 may be configured to perform such detection. The audio signals may correspond to voice signals that may be received by device 104's microphone and/or any other sensors. For example, the user of the attendee device 104 may say "hello" when the user logs on to the online meeting (as, for example, initiated by the host device 102). The voice signals may be used for training one or more components 106, 114 in recognizing voice of the attendee user of the user device 104 for the current online meeting and/or any future online meetings.

At 204, the speaker recognition component 108 of the online meeting engine 106 may be configured to use the received audio signals to execute a voice recognition training process (as discussed below) of the voice of the attendee user. The voice recognition training process may be configured to extract specific voice patterns and/or features corresponding to the voice signals of the attendee user. The specific voice patterns may be used to distinguish between attendee user's voice and interruptions that may occur during an online meeting.

At 206, additional audio signals may be received by the one or more components 106 and/or 114. Such additional audio signals may be indicative of the attendee user speaking during the online meeting and/or interruptions that may be occurring while the attendee user is speaking.

At 208, the speaker recognition component 108 of the online meeting engine 106 may be configured to compare the received additional audio signals with one or more extracted voice patterns and/or features. If, at 210, interruption is detected in the received additional audio signals (e.g., different voices, music, dog barking, noise(s), other interruptions, etc.), the speaker recognition component 108 of the online meeting engine 106 may be configured to transmit an indication and/or a command to the auto mute/unmute component 110, which, in turn, may be configured to transmit a command to mute the attendee device 104 in the online meeting (e.g., prevent audio being heard by other attendees in the online meeting), at 216. Additionally, a message may be displayed in the online meeting indicating that the attendee is handling the interruption and will return as soon as it is resolved. The message may be displayed in a chat area of the online meeting's user interface. At 218, the attendee device's 104 audio signals may be continuously monitored by one or more components 106 and/or 114. As part of the monitoring, the components 106, 114 may be configured to determine whether the interruption (either previous one and/or new one) is still present, at 210. The attendee user of the user device 104 may be also prompted to speak, such as, for example, when no interruption is detected by components 106, 114.

If, at 210, no interruption(s) are detected, the speaker recognition component 108 of the online meeting engine 106 may be configured to transmit a command to the auto mute/unmute component 110 to trigger unmuting of the attendee device 104 so that the attendee user of the user device 104 may be heard by other attendees in the online meeting, at 212. Alternatively, or in addition to, if no interruption(s) are originally detected, the attendee device 104 may remain unmuted, at 212.

Figure 3A:
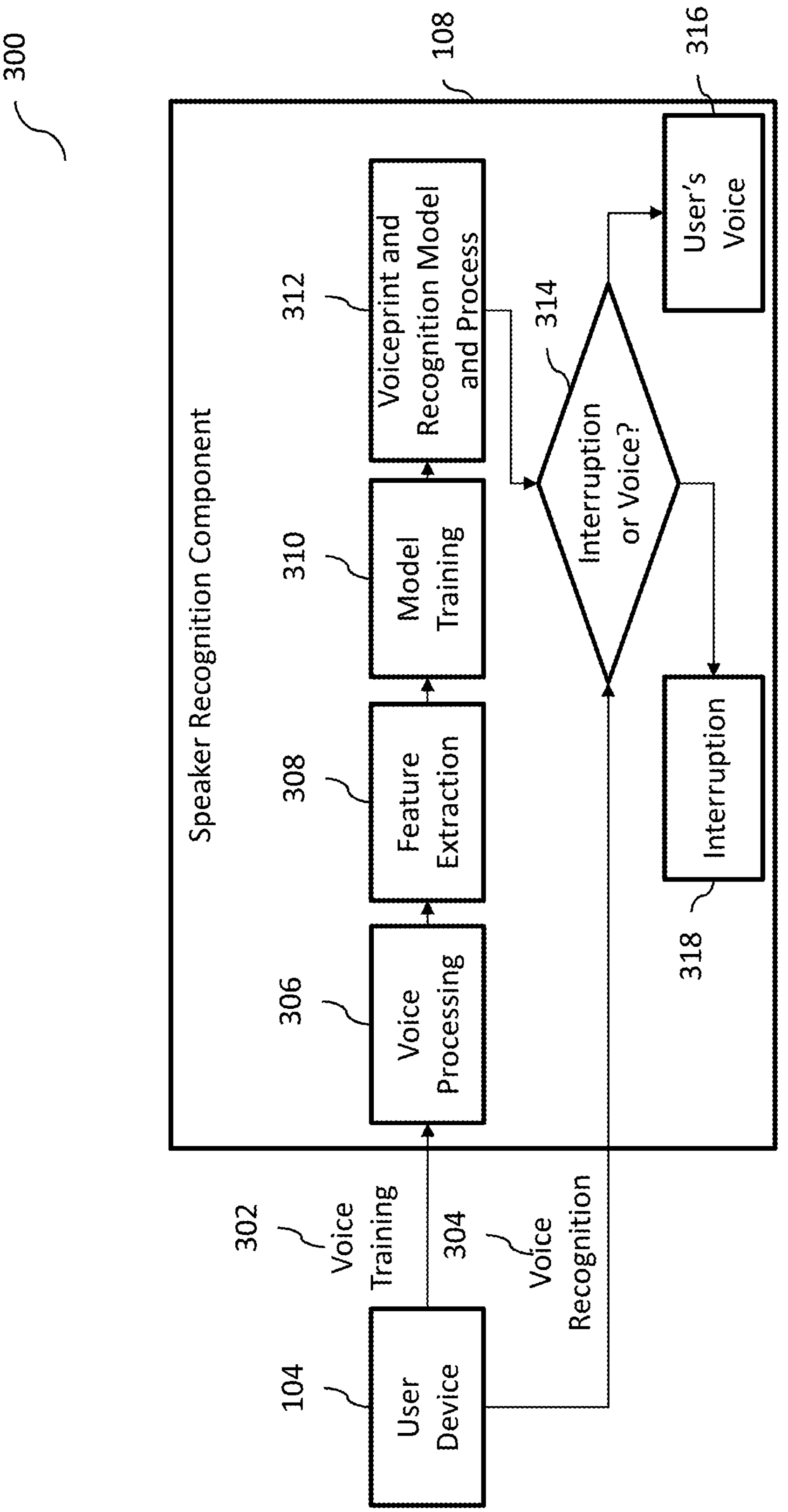
FIG. 3*a* illustrates an exemplary voice recognition system, according to some implementations of the current subject matter.

FIG. 3*a* illustrates an exemplary voice recognition system 300, according to some implementations of the current subject matter. The system 300 may be implemented in the system 100 shown in FIG. 1, and in particular, the speaker recognition component 108. The voice recognition system 300 may be used for performing voice recognition training of attendee user's voice. The system 300 may also be used to recognize whether one or more audio signals, received from the attendee user device 104 during an online meeting, corresponds to the attendee user's voice and/or is an interruption and/or includes audio signals that do not correspond to the attendee user's voice.

As shown in FIG. 3*a*, the speaker recognition component 108 may include a voice processing component 306, a feature extraction component 308, a model training component 310, and a voice print and recognition model and process component 312. The speaker recognition component 108 may also include a processing component 314 that may determine whether audio signals received, at 304, from the user device 104 correspond to an interruption and/or voice of the attendee user of the user device 104. If the audio signals correspond to the voice of the attendee user, then the speaker recognition component 108 may generate an output 316 indicating that the received audio signals, at 304, correspond to the attendee user's voice. This output 316 may be transmitted to the auto mute/unmute component 110 (as shown in FIG. 1), which may determine that the user device 104 may remain unmuted (and/or unmute the user device 104 after it has been muted). However, if the audio signals correspond to an interruption (and/or attendee user's voice and the interruption), then the speaker recognition component 108 may generate an output 318 indicating that the received audio signals, at 304, include an interruption (e.g., noise, voice that is not recognized attendee user's voice, etc.). Similar to output 316, the output 318 may be transmitted to the auto mute/unmute component 110 (as shown in FIG. 1), which may determine that the user device 104 should be muted until interruption has been resolved.

The voice training may be initiated, at 302, by the attendee user speaking into one or more audio receiving components of the user device 104 (e.g., a microphone). In some example implementations, the attendee user may speak any phrases that the attendee user may desire. Alternatively, or in addition, the attendee user may be prompted to read one or more standard phrases, e.g., "hello everyone", "good morning", "see you next time", etc. Such phrases may be displayed on a user interface of the user device 104, where the attendee user may read each displayed phrase one by one.

The feature extraction component 308 of the speaker recognition component 108 may be configured to extract one or more speech patterns from the phrases spoken by the attendee user. The extracted features may be provided to the model training component 310 to train one or more speech recognition models to generate one or more voiceprint recognition models and processes 312.

As discussed above, the process 314 may be configured to compare further audio input received from the user device 104 to the generated models and processes 312 to determine whether such additional received audio signals correspond to the voice of the attendee user and/or an interruption.

FIG. **3*b* illustrates an exemplary voice recognition model training process 340, according to some implementations of the current subject matter. The process 340 may be performed by the components 306-312 to generate one or more models and processes 312** that may be used for performing voice recognition. As can be understood, any other voice recognition model training processes may be used.

At 342, the one or more audio signals may be received from the user device 104 and processed by the voice processing component 306. In some implementations, a voice training dataset may be provided to the components 306-312 for training. One or more existing voice training datasets may be used for training and may include human voice training and test data that may be used for training a model. Additionally, the training datasets may include one or more existing noise recordings datasets of some commonly occurring noises (e.g., car engine, baby crying, dog barking, doorbell ringing, etc.).

At 344, the component 308 may be configured to extract and determine one or more mel-frequency cepstrum (MFCC) coefficients. In sound processing, the mel-frequency cepstrum (MFC) may refer to a representation of a short-term power spectrum of a sound using a linear cosine transform of a log power spectrum on a nonlinear mel scale of frequency, where MFCC make up coefficients representing MFC. Such coefficients may be determined from a type of cepstral representation of an audio recording. In some example implementations, up to 39 features may be extracted. As can be understood, any other audio signal processing techniques may be used.

Once the features are extracted, one or more neural networks (e.g., deep neural network (DNN), convolutional neural network (CNN), etc.) may be used by the model training component 310 to perform training of a model for recognition of attendee user's voice during online meetings, at 346. Any existing training tools may be used for training the model.

At 348, one or more scoring models may be used for determining whether a received audio signal from the user device 104 corresponds to the voice of the attendee user. In particular, a score may be determined and may represent a probability that the audio signal received from the user device 104 corresponds to the attendee user's voice. Once the training is complete, the process 314 may use the trained model to determine whether further audio signals received from the user device 104 during an online meeting correspond to the voice of the attendee user and/or interruptions.

In some implementations, one or more voice similarity thresholds (e.g., threshold scores, threshold probabilities, etc.) may be used to determine whether audio signals received from the user device 104 during an online meeting correspond to the voice of the attendee user and/or interruptions. For example, if the speaker recognition component 108 determines that the audio signals received from the user device 104 correspond to the voice of the attendee user with a certainty of at least 70%, then the user device 104 might not need to be muted, otherwise, the user device 104 may be muted.

In some example implementations, the user device 104 may be receive a message for display on a user interface of the user device 104 stating that one or more interruptions have been detected and that the user device 104 will be automatically muted and/or unmuted within a predetermined period of time (e.g., 5 seconds). The attendee user of the user device 104 may have the option to cancel the automatic muting.

Figure 4:
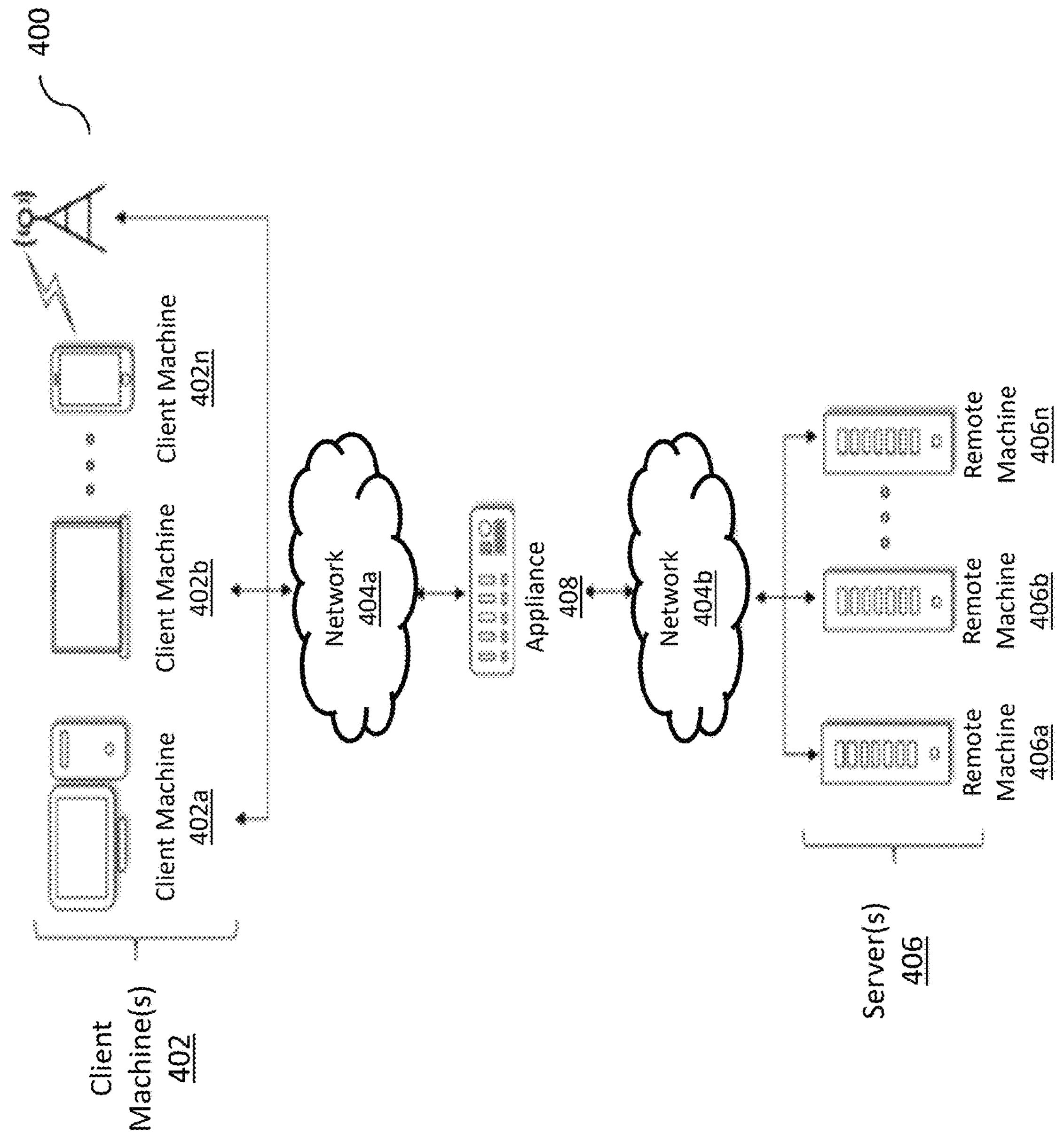
FIG. 4 illustrates an example of a network environment, according to some implementations of the current subject matter.

FIG. 4 illustrates an example of a network environment 400, according to some implementations of the current subject matter. Referring to FIGS. **1-3*b*, the network environment 400, in which various aspects of the disclosure may be implemented, may include one or more clients 402*a*-404*n*, one or more remote machines 406*a*-406*n*, one or more networks 404*a* and 404*b*, and one or more appliances 408 installed within the network environment 400. The clients 402*a*-402*n* communicate with the remote machines 406*a*-406*n* via the networks 404*a* and 404*b***.

In some example implementations, the clients **402*a*-402*n* may communicate with the remote machines 406*a*-406*n* via an appliance 408. The illustrated appliance 408 is positioned between the networks 404*a* and 404*b*, and may also be referred to as a network interface or gateway. In some example implementations, the appliance 408 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example implementations, multiple appliances 408 may be used, and the appliance(s) 408 may be deployed as part of the network 404*a* and/or 404*b***.

The clients **402*a*-402*n* may be generally referred to as client machines, local machines, clients, client nodes, client computers, client devices, computing devices, endpoints, or endpoint nodes. One or more of the clients 402*a*-402*n* may implement, for example, the client device 102 and/or the like. The remote machines 406*a*-406*n* may be generally referred to as servers or a server farm. In some example implementations, a client 402 may have the capacity to function as both a client node seeking access to resources provided by a server 406 and as a server 406 providing access to hosted resources for other clients 402***a*-402*n*. The networks 404*a* and 404*b* may be generally referred to as a network 404. The network 404 including the networks 404*a* and 404*b* may be configured in any combination of wired and wireless networks.

The servers 406 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 406 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example implementations, a server 406 may execute a remote presentation services program or other program that uses a thin-client or a remote-display protocol to capture display output generated by an application executing on a server 406 and transmit the application display output to a client 402.

In yet other example implementations, a server 406 may execute a virtual machine, such as the first virtual machine and/or the second virtual machine, to provide, for example, to the user at a client device, access to a computing environment such as the virtual desktop. The virtual machine may be managed by, for example, a hypervisor (e.g., a first hypervisor, a second hypervisor, and/or the like), a virtual machine manager (VMM), or any other hardware virtualization technique within the server 406.

In some example implementations, the network 404 may be a local-area network (LAN), a metropolitan area network (MAN), a wide area network (WAN), a primary public network, and/or a primary private network. Additional implementations may include one or more mobile telephone networks that use various protocols to communicate among mobile devices. For short-range communications within a wireless local-area network (WLAN), the protocols may include 1002.11, Bluetooth, and Near Field Communication (NFC).

Figure 5:
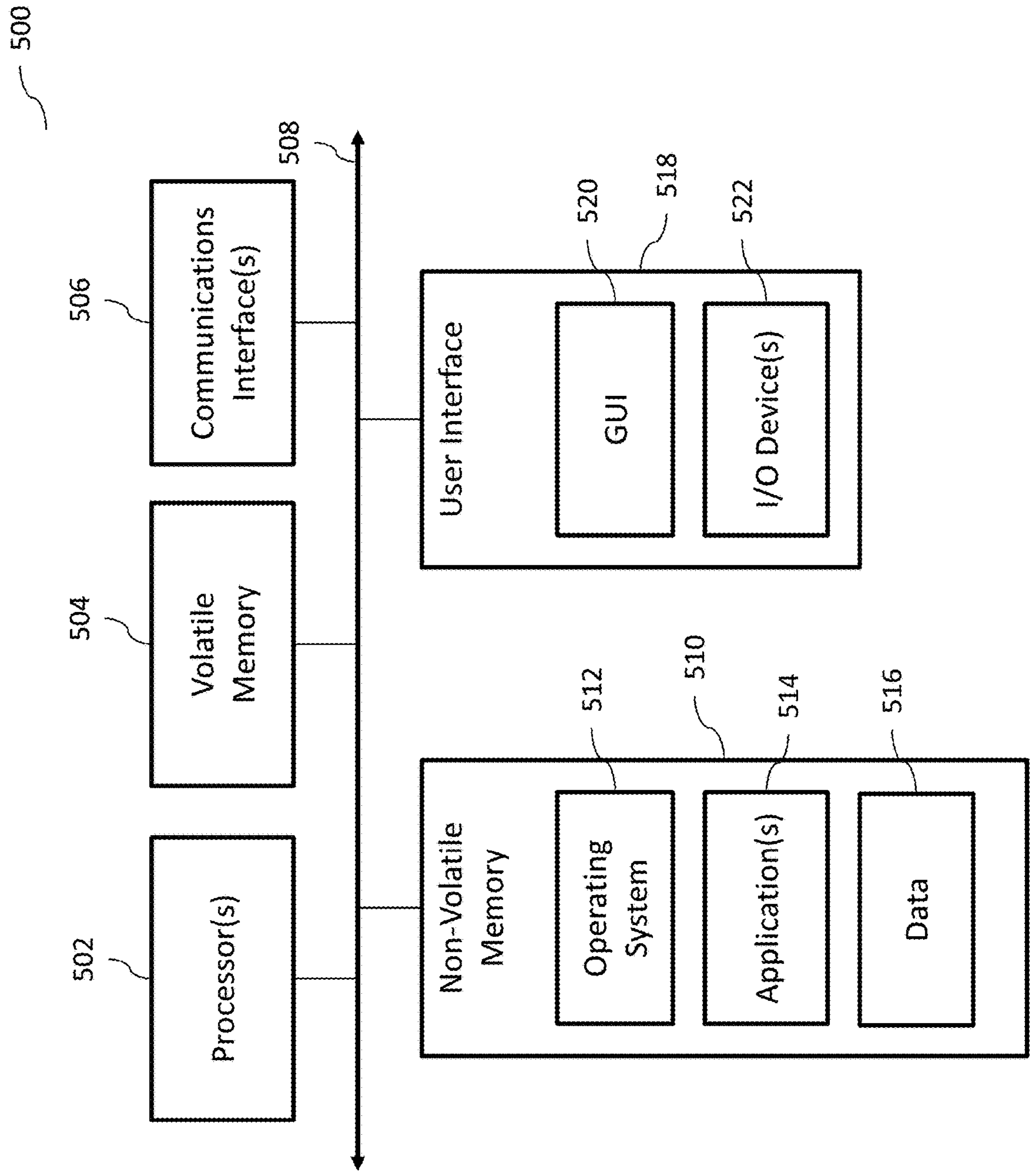
FIG. 5 depicts a block diagram illustrating an example of a computing device, according to some implementations of the current subject matter.

FIG. 5 depicts a block diagram illustrating an example of a computing device 500, in accordance with some example implementations. Referring to FIGS. 1-4, the computing device 500 may be useful for practicing an implementation of the system 100.

As shown in FIG. 5, the computing device 500 may include one or more processors 502, volatile memory 504 (e.g., RAM), non-volatile memory 510 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 518, one or more communications interfaces 506, and a communication bus 508. The user interface 518 may include a graphical user interface (GUI) 520 (e.g., a touchscreen, a display, and/or the like) and one or more input/output (I/O) devices 522 (e.g., a mouse, a keyboard, and/or the like). The non-volatile memory 510 may store an operating system 512, one or more applications 514, and data 516 such that computer instructions of the operating system 512 and/or applications 514 are executed by the processor(s) 502 out of the volatile memory 504. Data may be entered using an input device of the GUI 520 or received from I/O device(s) 522. Various elements of the computing device 500 may communicate via communication the communication bus 508. The computing device 500 as shown in FIG. 5 is shown merely as an example, and may be implemented by any computing or processing environment and with any type of machine or set of machines that may have suitable hardware and/or software capable of operating as described herein.

The processor(s) 502 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example implementations, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example implementations, the "processor" may be one or more physical processors or one or more "virtual" (e.g., remotely located or "cloud") processors.

The communications interfaces 506 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example implementations, one or more computing devices 500 may execute an application on behalf of a user of a client computing device (e.g., clients 402), may execute a virtual machine, which provides an execution session within which applications execute on behalf of a user or a client computing device (e.g., clients 402), such as a hosted desktop session (e.g., a virtual desktop), may execute a terminal services session to provide a hosted desktop environment, or may provide access to a computing environment including one or more of: one or more applications, one or more desktop applications, and one or more desktop sessions in which one or more applications may execute.

Figure 6:
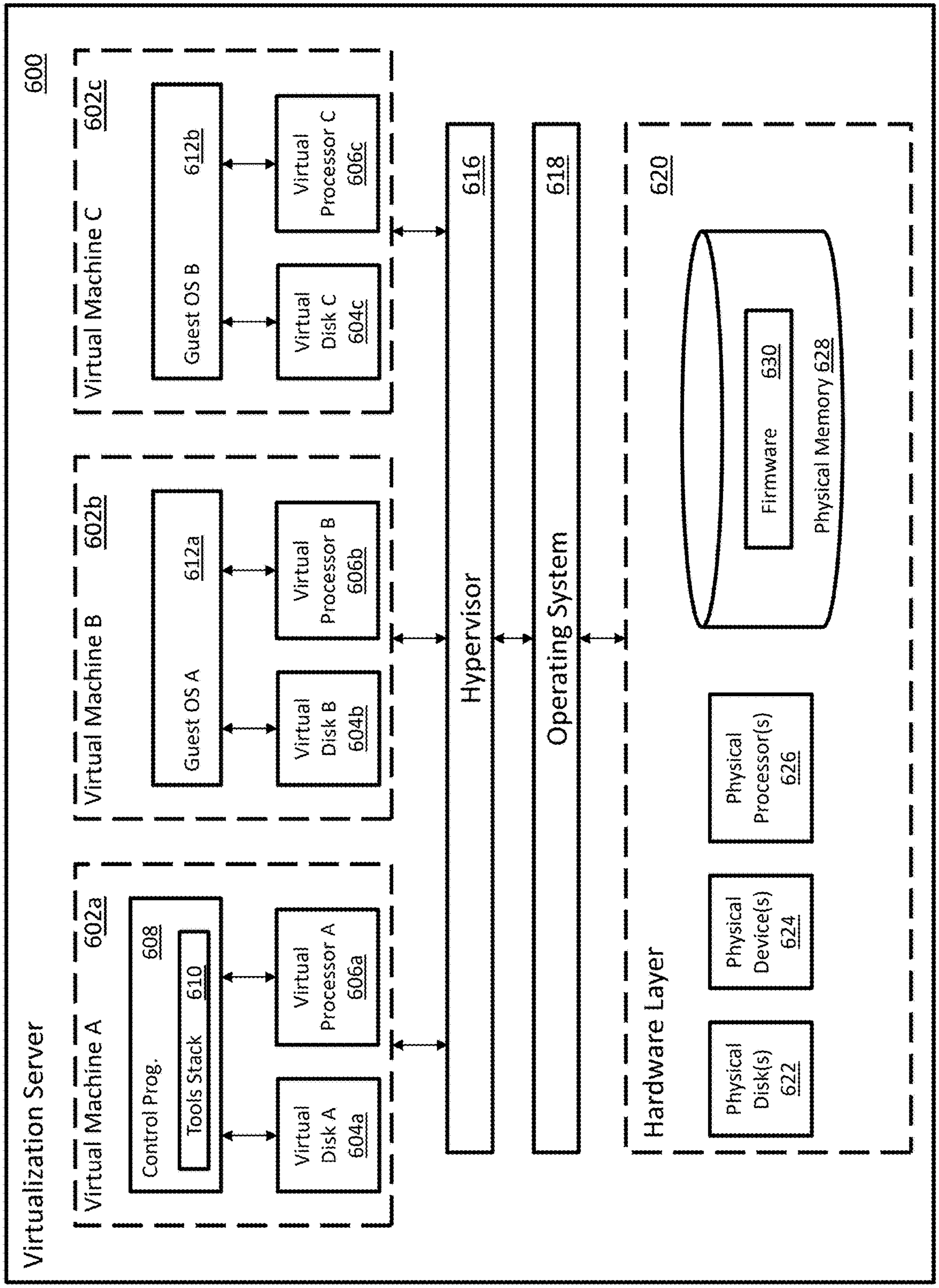
FIG. 6 illustrates a high-level architecture of an example of a virtualization system for implementing the computing system shown in FIG. 1, according to some implementations of the current subject matter.

FIG. 6 illustrates a high-level architecture of an example of a virtualization system for implementing the computing system 100, in accordance with some example implementations. As shown in FIG. 6, the virtualization system may be a single-server or multi-server system, or a cloud system, including at least one virtualization server 600 configured to provide virtual desktops and/or virtual applications to one or more client access devices 402*a-c*. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 600 may be configured as a virtualization server in a virtualization environment, for example, a single-server, multi-server, or cloud computing environment. Virtualization server 600 illustrated in FIG. 6 may be deployed as and/or implemented by one or more implementations of server 406 illustrated in FIG. 4 or by other known computing devices. Included in virtualization server 600 is hardware layer 620 that may include one or more physical disks 622, one or more physical devices 624, one or more physical processors 626, and one or more physical memories 628. In some implementations, firmware 630 may be stored within a memory element in physical memory 628 and be executed by one or more of physical processors 626. Virtualization server 600 may further include operating system 618 that may be stored in a memory element in physical memory 628 and executed by one or more of physical processors 626. Still further, hypervisor 616 may be stored in a memory element in physical memory 628 and be executed by one or more of physical processors 626. Presence of operating system 618 may be optional.

Executing on one or more of physical processors 626 may be one or more virtual machines 602A-C (generally, 602). Each virtual machine 602 may have virtual disk 604A-C and virtual processor 606A-C. In some implementations, first virtual machine 602A may execute, using virtual processor 606A, control program 608 that includes tools stack 610. Control program 608 may be referred to as a control virtual machine, Domain 0, Dom0, or other virtual machine used for system administration and/or control. In some implementations, one or more virtual machines 602B-C may execute, using virtual processor 606B-C, guest operating system 612A-B (generally, 612).

Physical devices 624 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 600. Physical memory 628 in hardware layer 620 may include any type of memory. Physical memory 628 may store data, and in some implementations may store one or more programs, or set of executable instructions. FIG. 6 illustrates an implementation where firmware 630 is stored within physical memory 628 of virtualization server 600. Programs or executable instructions stored in physical memory 628 may be executed by the one or more processors 626 of virtualization server 600.

Virtualization server 600 may also include hypervisor 616. In some implementations, hypervisor 616 may be a program executed by processors 626 on virtualization server 600 to create and manage any number of virtual machines 602. Hypervisor 616 may be referred to as a virtual machine monitor, or platform virtualization software. In some implementations, hypervisor 616 may be any combination of executable instructions and hardware that monitors virtual machines 602 executing on a computing machine. Hypervisor 616 may be a Type 2 hypervisor, where the hypervisor executes within operating system 618 executing on virtualization server 600. Virtual machines may then execute at a layer above hypervisor 616. In some implementations, the Type 2 hypervisor may execute within the context of a user's operating system such that the Type 2 hypervisor interacts with the user's operating system. In other implementations, one or more virtualization servers 600 in a virtualization environment may instead include a Type 1 hypervisor (not shown). A Type 1 hypervisor may execute on virtualization server 600 by directly accessing the hardware and resources within hardware layer 620. That is, while Type 2 hypervisor 616 accesses system resources through host operating system 618, as shown, a Type 1 hypervisor may directly access all system resources without host operating system 618. A Type 1 hypervisor may execute directly on one or more physical processors 626 of virtualization server 600, and may include program data stored in physical memory 628.

Hypervisor 616, in some implementations, may provide virtual resources to guest operating systems 612 or control programs 608 executing on virtual machines 602 in any manner that simulates operating systems 612 or control programs 608 having direct access to system resources. System resources can include, but are not limited to, physical devices 624, physical disks 622, physical processors 626, physical memory 628, and any other component included in hardware layer 620 of virtualization server 600. Hypervisor 616 may be used to emulate virtual hardware, partition physical hardware, virtualize physical hardware, and/or execute virtual machines that provide access to computing environments. In still other implementations, hypervisor 616 may control processor scheduling and memory partitioning for virtual machine 602 executing on virtualization server 600. Examples of hypervisor 616 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. The virtualization server 600 may execute hypervisor 616 that creates a virtual machine platform on which guest operating systems 612 may execute. When this is the case, virtualization server 600 may be referred to as a host server. An example of such a virtualization server is Citrix Hypervisor® provided by Citrix Systems, Inc., of Fort Lauderdale, Florida.

Hypervisor 616 may create one or more virtual machines 602B-C (generally, 602) in which guest operating systems 612 execute. In some implementations, hypervisor 616 may load a virtual machine image to create virtual machine 602. The virtual machine image may refer to a collection of data, states, instructions, etc. that make up an instance of a virtual machine. In other implementations, hypervisor 616 may execute guest operating system 612 within virtual machine 602. In still other implementations, virtual machine 602 may execute guest operating system 612.

In addition to creating virtual machines 602, hypervisor 616 may control the execution of at least one virtual machine 602. The hypervisor 616 may present at least one virtual machine 602 with an abstraction of at least one hardware resource provided by virtualization server 600 (e.g., any hardware resource available within hardware layer 620). In some implementations, hypervisor 616 may control the manner in which virtual machines 602 access physical processors 626 available in virtualization server 600. Controlling access to physical processors 626 may include determining whether virtual machine 602 should have access to processor 626, and how physical processor capabilities are presented to virtual machine 602.

As shown in FIG. 6, the virtualization server 600 may host or execute one or more virtual machines 602. Virtual machine 602 may be a set of executable instructions and/or user data that, when executed by processor 626, may imitate the operation of a physical computer such that virtual machine 602 can execute programs and processes much like a physical computing device. While FIG. 6 illustrates an implementation where virtualization server 600 hosts three virtual machines 602, in other implementations virtualization server 600 may host any number of virtual machines 602. Hypervisor 616 may provide each virtual machine 602 with a unique virtual view of the physical hardware, including memory 628, processor 626, and other system resources 622, 624 available to that virtual machine 602. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 616 may create one or more unsecure virtual machines 602 and one or more secure virtual machines 602. Unsecure virtual machines 602 may be prevented from accessing resources, hardware, memory locations, and programs that secure virtual machines 602 may be permitted to access. In other implementations, hypervisor 616 may provide each virtual machine 602 with a substantially similar virtual view of the physical hardware, memory, processor, and other system resources available to virtual machines 602.

Each virtual machine 602 may include virtual disk 604A-C (generally 604) and virtual processor 606A-C (generally 606.) Virtual disk 604 may be a virtualized view of one or more physical disks 622 of virtualization server 600, or a portion of one or more physical disks 622 of virtualization server 600. The virtualized view of physical disks 622 may be generated, provided, and managed by hypervisor 616. In some implementations, hypervisor 616 may provide each virtual machine 602 with a unique view of physical disks 622. These particular virtual disk 604 (included in each virtual machine 602) may be unique, when compared with other virtual disks 604.

Virtual processor 606 may be a virtualized view of one or more physical processors 626 of virtualization server 600. The virtualized view of physical processors 626 may be generated, provided, and managed by hypervisor 616. Virtual processor 606 may have substantially all of the same characteristics of at least one physical processor 626. Virtual processor 626 may provide a modified view of physical processors 626 such that at least some of the characteristics of virtual processor 606 are different from the characteristics of the corresponding physical processor 626.

Figure 7:
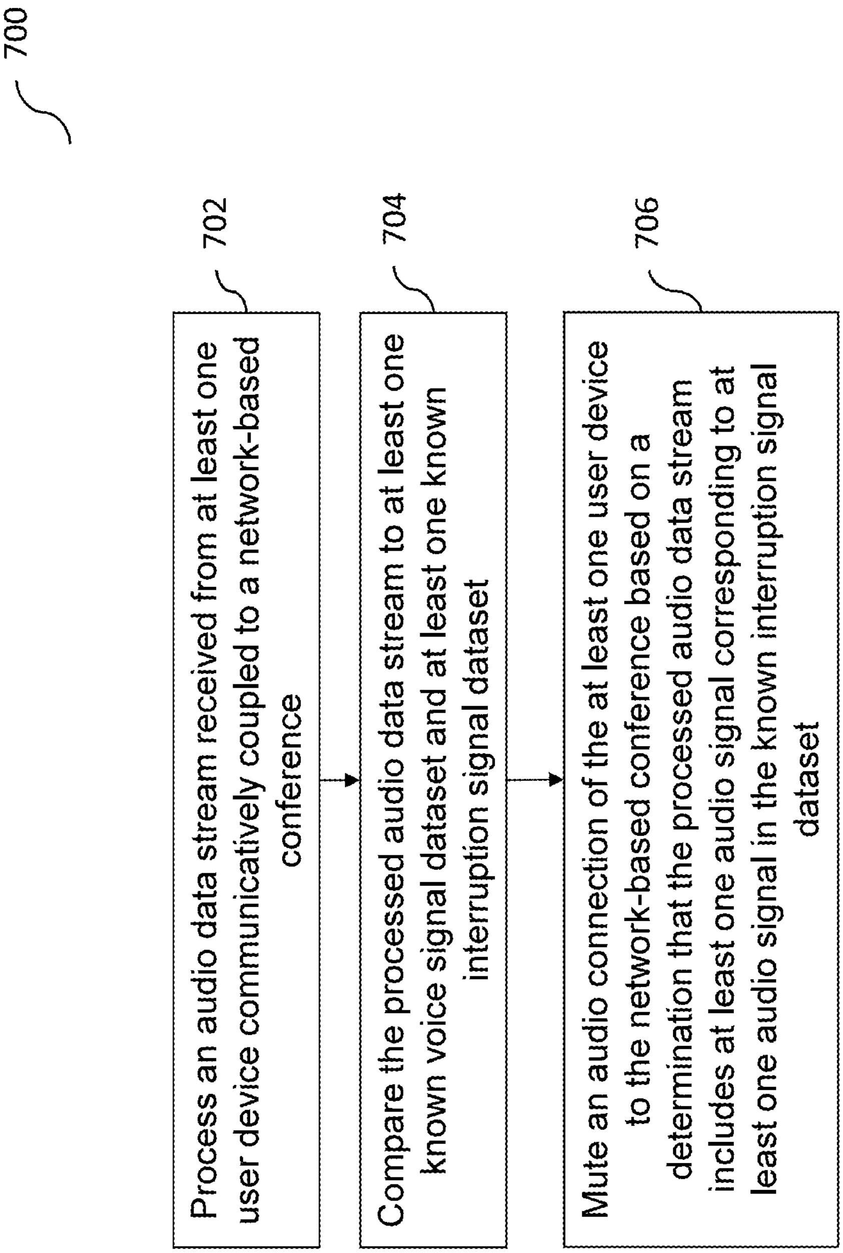
FIG. 7 illustrates an example of a method, according to some implementations of the current subject matter.

FIG. 7 illustrates an example of a method 700 for managing interruptions during an online meeting, according to some implementations of the current subject matter. The method 700 may be performed by the system 100 shown in FIG. 1, including the speaker recognition component 108 shown in FIG. 3*a*. For example, the process 700 may be executed using components 106, 114 (shown in FIG. 1), where the component(s) may be any combination of hardware and/or software. The components 106, 114 may be incorporated into one or more devices capable of managing interruptions during an online meeting.

At 702, the components 106, 114 may be configured to process an audio data stream (e.g., voice signals 103, as shown in FIG. 1) received from at least one user device (e.g., user device 104, as shown in FIG. 1) communicatively coupled to a network-based conference (e.g., online meeting). The signals may correspond to a voice of an attendee user of the user device 104 and/or any interruptions (e.g., other voices, noise, etc.) that may also be received by the user device 104 and transmitted to the components 106, 114.

At 704, the component 106, 114 may be configured to compare the processed audio data stream to at least one known voice signal dataset and at least one known interruption signal dataset. For example, the speaker recognition component 108 may be configured to perform recognition of audio signals received from the user device 104 and/or perform training of models (as shown in FIGS. 3*a*-*b*) using known audio datasets (e.g., voice datasets, noise datasets, etc.).

At 706, the components 106, 114 may be configured to mute an audio connection of the user device to the network-based conference, while the user device is communicatively coupled to the network-based conference, based on a determination that the processed audio data stream includes at least one audio signal corresponding to at least one audio signal in the known interruption signal dataset. For example, upon detecting noise and/or other interruptions coming from the user device 104, the online meeting engine 106 may be configured to cause muting of the user device 104 to prevent other attendees of the online meeting from hearing such noise.

In some implementations, the current subject matter can include one or more of the following optional features. The known voice signal dataset may include one or more audio signals corresponding to one or more voice signals of a user (e.g., attendee user) of the user device (e.g., user device 104 shown in FIG. 1). The known interruption signal dataset may include one or more audio signals received by the user device that do not correspond to one or more voice signals of the attendee user of the user device.

Figure 3B:
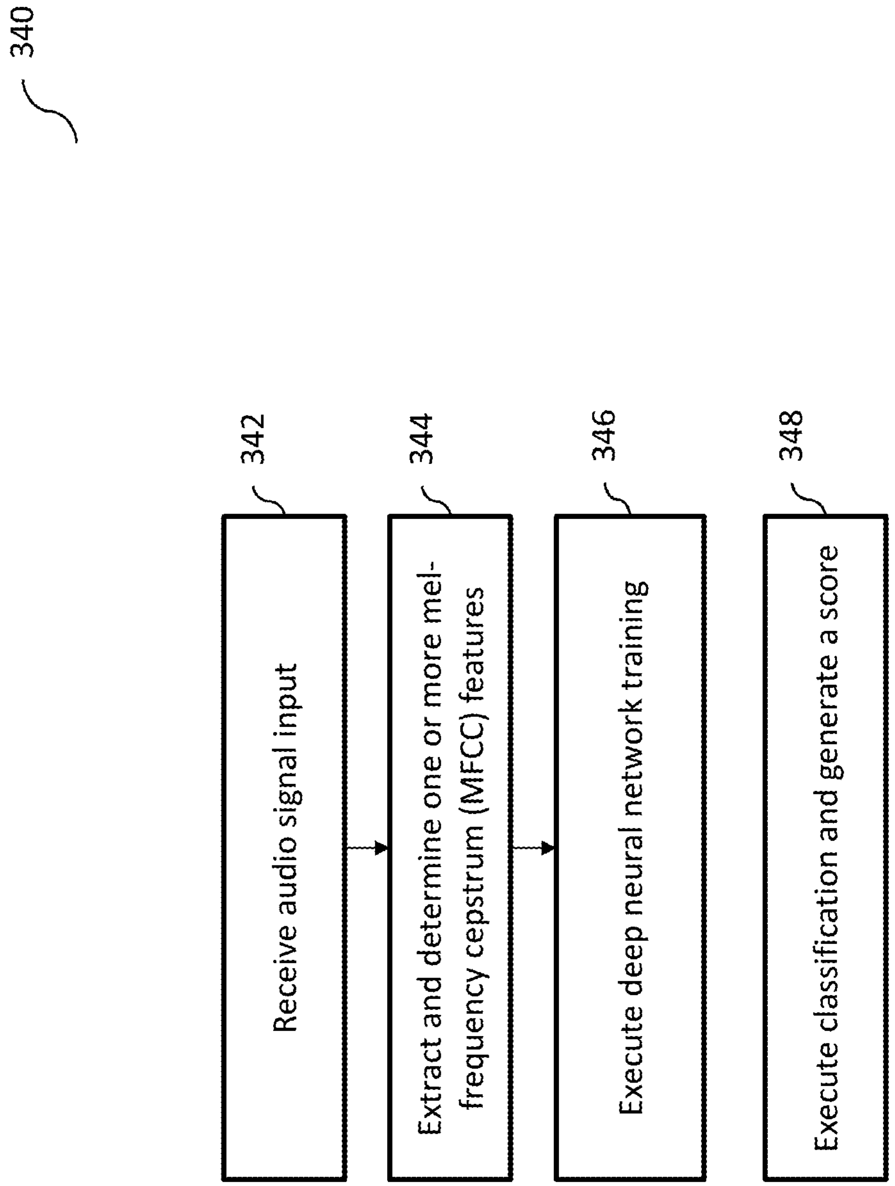
FIG. 3*b* illustrates an exemplary voice recognition model training process, according to some implementations of the current subject matter.

In some implementations, the method may include training (e.g., as shown in FIGS. 3*a*-*b*) one or more models using one or more audio signals corresponding to one or more voice signals of the attendee user of the user device, and determining, using the trained models, that the processed audio data stream includes at least one audio signal corresponding to at least one audio signal in the known voice signal dataset. The method may further include maintaining, based on the determination that the processed audio data stream includes at least one audio signal corresponding to at least one audio signal in the known voice signal dataset, an unmuted audio connection of the user device to the network-based conference.

In some implementations, the method may further include unmuting the audio connection of the user device to the network-based conference based on a determination that the processed audio data stream no longer includes at least one audio signal corresponding to at least one audio signal in the known interruption signal dataset.

In some implementations, the muting may be executed automatically upon the determination that the processed audio data stream includes at least one audio signal corresponding to at least one audio signal in the known interruption signal dataset.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium.

The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

processing, using at least one processor, an audio data stream received from at least one user device communicatively coupled to a network-based conference;

comparing, using the at least one processor, the processed audio data stream to at least one known voice signal dataset and at least one known interruption signal dataset;

maintaining an audio connection of the at least one user device to the network-based conference as unmuted if the processed audio data stream contains both a first audio signal corresponding to at least one audio signal in the at least one known voice signal data set and a second audio signal in the at least one known interruption signal dataset muting, using the at least one processor, the audio connection of the at least one user device to the network-based conference, while the at least one user device is communicatively coupled to the network-based conference, if the processed audio data stream includes only the at least one audio signal corresponding to at least one audio signal in the at least one known interruption signal dataset; and unmuting the audio connection of the at least one user device to the network based conference based on a determination that the processed audio data stream no longer includes at least one audio signal corresponding to at least one audio signal in the at least one known interruption signal dataset.

2. The method according to claim 1, wherein the at least one known voice signal dataset includes one or more audio signals corresponding to one or more voice signals of a user of the at least one user device.

3. The method according to claim 2, wherein the at least one known interruption signal dataset includes one or more audio signals received by the at least one user device that do not correspond to one or more voice signals of the user of the at least one user device.

4. The method according to claim 1, further comprising training one or more models using one or more audio signals corresponding to one or more voice signals of a user of the at least one user device; and determining, using the one or more trained models, that the processed audio data stream includes at least one audio signal corresponding to at least one audio signal in the at least one known voice signal dataset.

5. The method according to claim 4, further comprising maintaining, based on the determination that the processed audio data stream includes at least one audio signal corresponding to at least one audio signal in the at least one known voice signal dataset, an unmuted audio connection of the at least one user device to the network-based conference.

6. The method according to claim 1, wherein the muting is executed automatically upon the determination that the processed audio data stream includes at least one audio signal corresponding to at least one audio signal in the at least one known interruption signal dataset.

7. A system comprising:

at least one programmable processor; and a non-transitory machine-readable medium storing instructions that, when executed by the at least one programmable processor, cause the at least one programmable processor to perform operations comprising:

processing, using at least one processor, an audio data stream received from at least one user device communicatively coupled to a network-based conference;

comparing, using the at least one processor, the processed audio data stream to at least one known voice signal dataset and at least one known interruption signal dataset;

maintaining an audio connection of the at least one user device to the network-based conference as unmuted if the processed audio data stream contains both a first audio signal corresponding to at least one audio signal in the at least one known voice signal data set and a second audio signal in the at least one known interruption signal dataset;

muting, using the at least one processor, the audio connection of the at least one user device to the network-based conference, while the at least one user device is communicatively coupled to the network-based conference, if the processed audio data stream includes only an audio signal corresponding to at least one audio signal in the at least one known interruption signal dataset; and unmuting the audio connection of the at least one user device to the network-based conference based on a determination that the processed audio data stream no longer includes at least one audio signal corresponding to at least one audio signal in the at least one known interruption signal dataset.

8. The system according to claim 7, wherein the at least one known voice signal dataset includes one or more audio signals corresponding to one or more voice signals of a user of the at least one user device.

9. The system according to claim 8, wherein the at least one known interruption signal dataset includes one or more audio signals received by the at least one user device that do not correspond to one or more voice signals of the user of the at least one user device.

10. The system according to claim 7, wherein the operations further comprise training one or more models using one or more audio signals corresponding to one or more voice signals of a user of the at least one user device; and determining, using the one or more trained models, that the processed audio data stream includes at least one audio signal corresponding to at least one audio signal in the at least one known voice signal dataset.

11. The system according to claim 7, wherein the muting is executed automatically upon the determination that the processed audio data stream includes at least one audio signal corresponding to at least one audio signal in the at least one known interruption signal dataset.

12. A computer program product comprising a non-transitory machine-readable medium storing instructions that, when executed by at least one programmable processor, cause the at least one programmable processor to perform operations comprising:

processing, using at least one processor, an audio data stream received from at least one user device communicatively coupled to a network-based conference;

comparing, using the at least one processor, the processed audio data stream to at least one known voice signal dataset and at least one known interruption signal dataset;

maintaining an audio connection of the at least one user device to the network-based conference as unmuted if the processed audio data stream contains both a first audio signal corresponding to at least one audio signal in the at least one known voice signal data set and a second audio signal in the at least one known interruption signal dataset muting, using the at least one processor, the audio connection of the at least one user device to the network-based conference, while the at least one user device is communicatively coupled to the network-based conference, if the processed audio data stream includes only the at least one audio signal corresponding to at least one audio signal in the at least one known interruption signal dataset; and unmuting the audio connection of the at least one user device to the network-based conference based on a determination that the processed audio data stream no longer includes at least one audio signal corresponding to at least one audio signal in the at least one known interruption signal dataset.

13. The computer program product according to claim 12, wherein the at least one known voice signal dataset includes one or more audio signals corresponding to one or more voice signals of a user of the at least one user device.

14. The computer program product according to claim 13, wherein the at least one known interruption signal dataset includes one or more audio signals received by the at least one user device that do not correspond to one or more voice signals of the user of the at least one user device.

15. The computer program product according to claim 12, wherein the operations further comprise training one or more models using one or more audio signals corresponding to one or more voice signals of a user of the at least one user device; and determining, using the one or more trained models, that the processed audio data stream includes at least one audio signal corresponding to at least one audio signal in the at least one known voice signal dataset wherein the operations further comprise maintaining, based on the determination that the processed audio data stream includes at least one audio signal corresponding to at least one audio signal in the at least one known voice signal dataset, an unmuted audio connection of the at least one user device to the network-based conference.

16. The computer program product according to claim 12, wherein the muting is executed automatically upon the determination that the processed audio data stream includes at least one audio signal corresponding to at least one audio signal in the at least one known interruption signal dataset.

* * * * *